(12) United States Patent
Matsushita et al.

(10) Patent No.: US 6,977,769 B2
(45) Date of Patent: Dec. 20, 2005

(54) PUMP LIGHT SOURCE DEVICE FOR OPTICAL RAMAN AMPLIFICATION AND OPTICAL RAMAN AMPLIFICATION SYSTEM USING THE SAME

(75) Inventors: Shunichi Matsushita, Tokyo (JP); Yoshihiro Emori, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 51 days.

(21) Appl. No.: 10/062,189

(22) Filed: Jan. 30, 2002

(65) Prior Publication Data

US 2002/0141698 A1    Oct. 3, 2002

(30) Foreign Application Priority Data

Jan. 31, 2001    (JP) .............................. 2001-022620

(51) Int. Cl.⁷ .............................................. H01S 3/00
(52) U.S. Cl. ...................................................... 359/334
(58) Field of Search ............................ 359/334, 341.33

(56) References Cited

U.S. PATENT DOCUMENTS

| | | | |
|---|---|---|---|
| 5,692,082 A | | 11/1997 | Fukushima .................. 385/88 |
| 6,040,942 A | * | 3/2000 | Bergmann .................. 359/487 |
| 6,356,383 B1 | * | 3/2002 | Cornwell, Jr. et al. ...... 359/334 |
| 6,433,920 B1 | * | 8/2002 | Welch et al. ................ 359/334 |
| 6,433,921 B1 | * | 8/2002 | Wu et al. .................... 359/334 |
| 6,522,796 B1 | * | 2/2003 | Ziari et al. .................... 385/11 |
| 2001/0053264 A1 | | 12/2001 | Edagawa et al. ............. 385/27 |
| 2002/0101634 A1 | * | 8/2002 | Ye .............................. 359/122 |
| 2002/0176153 A1 | * | 11/2002 | Matsushita et al. ......... 359/333 |

FOREIGN PATENT DOCUMENTS

JP    2001356377 A  * 12/2001  ........... G02F 01/35

OTHER PUBLICATIONS

FITEL Technical specification proposal on Multiplexed 14xx nm pump module with MPU based control circuit (Proposal), HPU30-DS06CC-R-UU1, HPU30-DS06CL-R-UU2, May, 2000 FT2F-00106, Block Diagram.
FITEL Technical specification proposal on Multiplexed 14xx nm pump module with MPU based control circuit (Proposal), HPU30-DS06CC-R, May, 2000 FT2F-00097, Block Diagram.

* cited by examiner

Primary Examiner—Jack Keith
Assistant Examiner—Deandra M. Hughes
(74) Attorney, Agent, or Firm—Oblon, Spivak, McClelland, Maier & Neustadt, P.C.

(57) ABSTRACT

Disclosed are: a pump light source device for Raman amplification for outputting a pump light for causing signal lightwaves introduced into an optical fiber to undergo Raman amplification therein, the device including two light sources, a polarization beam combiner or a polarization-maintaining optical beam coupler to which two lightwaves are input and which is adapted to combine and output these lightwaves, and a depolarizer adapted to depolarize and output the input lightwaves, wherein the lightwaves output from the two light sources are input to the polarization beam combiner or the polarization-maintaining optical beam coupler to output a combined composite lightwave, the composite lightwave being input to the depolarizer to output a lightwave with lower degree of polarization; and a Raman amplification system using the same.

10 Claims, 11 Drawing Sheets

PUMP LIGHT SOURCE DEVICE FOR OPTICAL RAMAN AMPLIFICATION AND OPTICAL RAMAN AMPLIFICATION SYSTEM USING THE SAME

BACKGROUND OF THE INVENTION

1. Field of the Invention

The present invention relates to a pump light source device for an optical Raman amplifier for causing signal lightwave to undergo optical Raman amplification in an optical fiber by utilizing stimulated Raman scattering and to an optical Raman amplification system using the same.

2. Description of the Related Art

As shown in FIG. 11, generally speaking, in an optical Raman amplification system, when guiding an optical signal 2 output from a light transmitting station 1 to a light receiving station 4 through a light transmission path 3 consisting of an optical fiber or the like, an optical Raman amplifier 5 is arranged at some midpoint in the light transmission path 3 or at an end thereof to cause the optical signal to undergo optical Raman amplification in order that the optical signal 2 attenuated in the light transmission path 3 may attain the requisite optical signal level for reception by the light receiving station 4.

In the light transmitting station 1, electrical information to be transmitted is converted to an optical signal before it is output to the light transmission path 3. The optical signal is prepared by directly applying an electric signal of the information to be transmitted to a semiconductor laser diode or the like constituting the signal light source or by providing behind the signal light source an external modulator by means of which the light oscillated by the signal light source is modulated by the electric signal.

In the light receiving station 4, the signal lightwave 2 propagated through the light transmission path 3 is converted to an electric signal by optical-to-electrical-converter, such as a photo diode, and the information transmitted from the light transmitting station 1 is demodulated, whereby the information is read.

As shown in FIG. 10, in the optical Raman amplifier 5, a pump light from a pump light source device 7 is transmitted to an end portion of a Raman Gain medium 31 constituting a part of the light transmission path 3 by way of an optical coupler 6 to input the pump light to the Raman Gain medium 31, in which stimulated Raman scattering is generated to thereby effect Raman amplification on the optical signal 2. The wavelength of the pump light is selected so as to be shorter than the wavelength of the optical signal 2 emitted from the light transmitting station 1 by approximately 20 to 200 nm.

The Raman gain obtained in the Raman Gain medium 31 is greatly dependent on the mutual relationship between the polarization state of the pump light and the polarization state of the signal lightwave 2. For example, assuming that the polarization of the pump light is linear polarization (Normally, a laser beam emitted from a semiconductor laser diode (LD) is in the linear polarization state), the Raman gain increases when the signal lightwave 2 is a linearly polarized light parallel to the polarization of the pump light, and it decreases when the signal lightwave 2 is a linearly polarized light perpendicular to the polarization of the pump light. This phenomenon, which is called PDG (polarization dependent gain), leads to deterioration in the bit error rate of the optical Raman amplifier.

As described above, if the polarization state of the pump light or the signal lightwave 2 fluctuates in the Raman amplification medium 31 as time passes, the gain also fluctuates the same. This fluctuation in gain is not desirable for the transmission of information.

In view of this, not less than two LDs per wavelength and a polarization beam combiner have conventionally been used in the pump light source device 7, and polarization combination has been conducted such that the states of polarization thereof are orthogonal to each other to overcome the polarization dependence of the Raman gain.

Conventionally, in order to eliminate the polarization dependence of Raman Gain, oscillating beams from light sources, e.g., semiconductor laser diodes, of the same oscillation wavelength are combined such that an orthogonal polarization state is attained and the lightwaves thus combined are input to the Raman Gain medium, or light with lower degree of polarization is input to the Raman Gain medium to thereby overcome the polarization dependence of the gain.

However, in the case of the method in which lightwaves from two light sources of the same wavelength are combined by using a polarization beam combiner, if one light source is out of order, only the other light source operates, so that there appears a fluctuation due to time in the Raman gain because of a fluctuation due to time in the polarization state of the pump light or the signal lightwave, resulting in generation of a fluctuation in amplification gain.

In the method of outputting pump light which have lower degree of polarization to gain medium, the following problems are involved when a plurality of pump lights having different wavelengths are combined.

1. When the polarization beam combiner is used for coupling pump light whose degree of polarization is low, an efficiency of coupling pump light is less than higher degree of polarization because polarization beam combiner selects the state of polarization of coupling light.

2. When using a PLC or an AWG, there is a limitation regarding the wavelength interval of the light sources, and the spectral line width of the light source is also limited to enhance the coupling efficiency.

SUMMARY OF THE INVENTION

According to a first aspect of the present invention, a pump light source device to amplify signal lightwaves using stimulated Raman scattering phenomenon in an optical transmission line consisting of an optical fibers comprise: two pump light sources, a polarization beam combiner or a polarization-maintaining optical beam coupler to which two pump lights are input and output combined lightwaves whose polarization states are perpendicular to each other and a depolarizer adapted to depolarize the composite pump lights. The output lightwaves from the said two pump light sources are input to the said polarization beam combiner or the said polarization-maintaining optical beam coupler to output a composite lightwave with orthogonal polarization axes or maintaining the polarization state of inputting and the said composite lightwave is input to the said depolarizer to output a lightwave with lower degree of polarization.

According to a second aspect of the present invention, a pump light source device to amplify signal lightwaves using stimulated Raman scattering phenomenon in an optical transmission line consisting of an optical fiber comprises: a plurality of pairs of pump light sources, a plurality of sets of polarization beam combiners or polarization-maintaining optical beam couplers, a plurality of sets of depolarizers, and an optical beam coupler for combining a plurality of beams. The output lightwave from each pair of pump light sources are respectively input to each set of the said polarization beam combiners or the said polarization-maintaining optical beam couplers to output a composite lightwave of each set with orthogonal polarization axes or maintaining the polarization state of inputting. The composite lightwave of each set is input to each set of the said depolarizers to output a depolarized lightwave for each set with lower degree of polarization, the depolarized light of each set is combined and output by the optical beam coupler.

According to a third aspect of the present invention, a pump light source device to amplify signal lightwaves using stimulated Raman scattering phenomenon in an optical transmission line consisting of an optical fiber comprises: a plurality of pairs of pump light sources, a plurality of sets of polarization beam combiners or polarization-maintaining optical beam couplers, a depolarizer, and a polarization-maintaining optical multiplexer for combining a plurality of beams. The output lightwaves from each pair of pump light sources are respectively input to each set of the said polarization beam combiners or the said polarization-maintaining optical beam couplers to output a composite lightwave of each set with orthogonal polarization axes or maintaining the polarization state of inputting. After the composite lightwave of each set is combined by the polarization-maintaining optical beam coupler, the combined lightwaves are input to the depolarizer to output a lightwave with lower degree of polarization.

According to a fourth aspect of the present invention, a pump light source device to amplify signal lightwaves using stimulated Raman scattering phenomenon in an optical transmission line consisting of optical fibers comprises: one or a plurality of pairs of pump light sources, one or a plurality of individual light sources which is/are different therefrom, one or a plurality of sets of polarization beam combiners or polarization-maintaining optical beam couplers, depolarizers in a number corresponding to the number of the plurality of pairs of pump light sources plus the number of the individual light source/individual light sources, and an optical beam coupler for combining a plurality of beams. The output lightwaves from each pair of pump light sources are respectively input to each set of the said polarization beam combiners or the said polarization-maintaining optical beam couplers to output a composite lightwave of each set with orthogonal polarization axes or maintaining the polarization state of inputting. The composite lightwave of each set is input to each set of depolarizer to output a depolarized lightwave for each set with lower degree of polarization, and in which the lightwave from the individual light sources are respectively input to the depolarizer to output a depolarized lightwave with lower degree of polarization, the depolarized lightwave for each set. The depolarized lightwave from the individual light source is combined and output by the optical beam coupler.

According to a fifth aspect of the present invention, a pump light source device to amplify signal lightwaves using stimulated Raman scattering phenomenon in an optical transmission line consisting of optical fibers comprises: one or a plurality of pairs of light sources, one or a plurality of individual light sources which are different therefrom, a plurality of sets of polarization beam combiners or polarization-maintaining optical beam couplers, a polarization-maintaining optical multiplexer for combining a plurality of beams, and a depolarizer. The output lightwaves from each pair of light sources are respectively input to each set of the said polarization beam combiners or the said polarization-maintaining optical beam couplers to output a composite lightwave of each set with orthogonal polarization axes or maintaining the polarization state of inputting. The composite lightwave of each set and the lightwaves output from the individual light sources are combined by the polarization-maintaining optical beam coupler, and then input to the depolarizer to output a lightwave with lower degree of polarization.

According to the present invention, a Raman amplification system comprises: a light transmitting station for transmitting signal lightwave, a light receiving station for receiving the signal lightwave, an optical fiber for propagating the signal lightwave from the light transmitting station to the light receiving station, and a Raman amplification pump light source device for introducing a pump light into the optical fiber to amplify the signal lightwave using Raman scattering phenomenon in the optical fiber, in which the Raman amplification pump light source device consists of a pump light source device for Raman amplification according to any one of the first to fifth aspects of the present invention.

DETAILED DESCRIPTION

Figure 1:
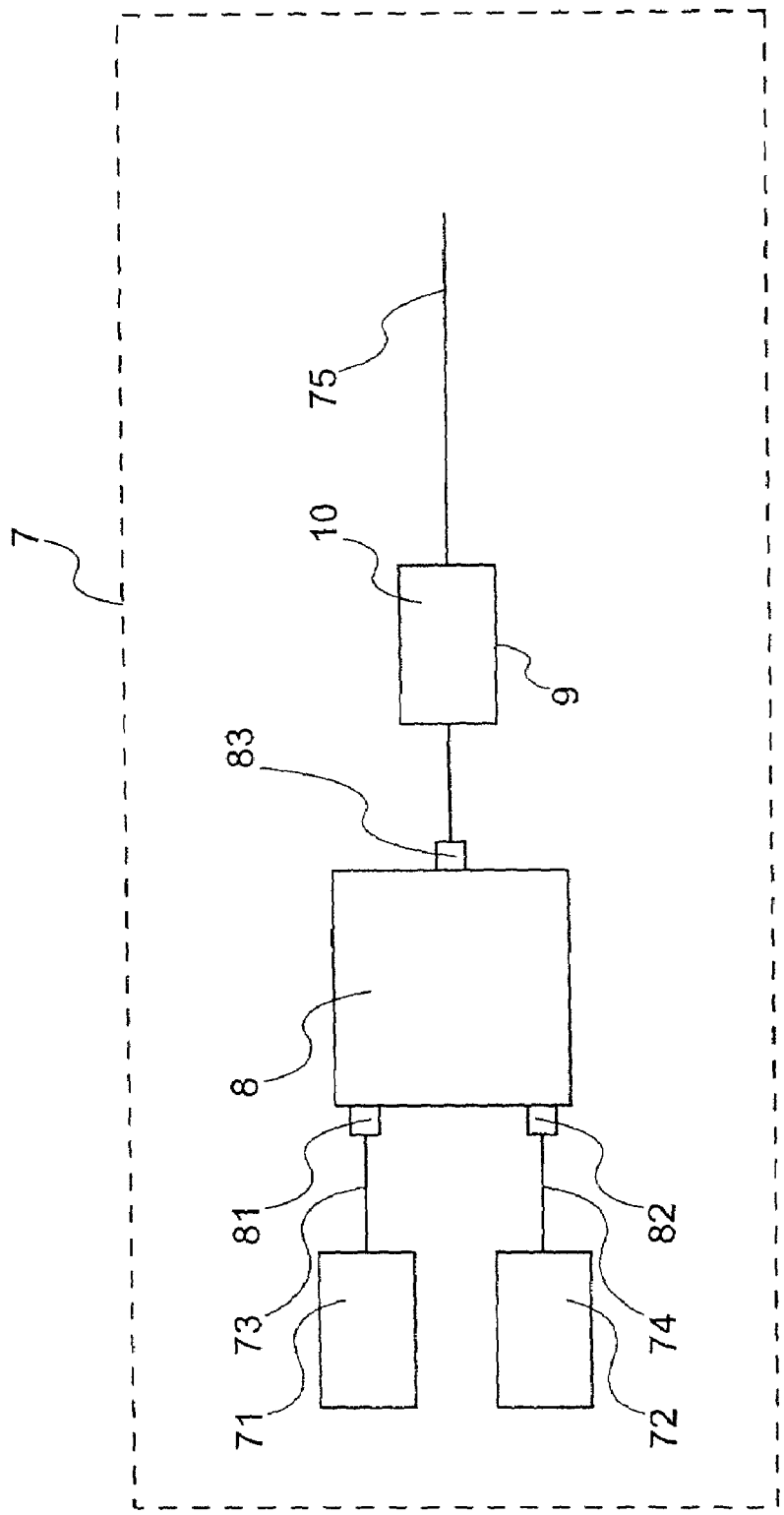
FIG. 1 is a schematic diagram showing a construction according to the present invention.

A depolarizer is formed, for example, of a crystallization, such as birefringent calcite or rutile, or a polarization maintaining optical fiber which have birefringence. A birefringent material has principal axes whose refrective indexes are different each other in light being propagated at different velocities in these axes.

A polarization beam combiner or a polarization-maintaining optical beam coupler combines lightwaves guided through two polarization maintaining optical fibers such that the states of polarization are orthogonal to each other or that the input polarization states are maintained before outputting the lightwaves to an optical fiber for output. When a birefringent crystal is used for the depolarizer, it is desirable to use a single mode fiber for the optical fiber for output so that a retardation caused by the birefringence of the depolarizer may not be canceled. When a polarization maintaining optical fiber is used for the depolarizer, it is desirable to use a polarization maintaining optical fiber for output in order to stabilize the depolarization.

Generally speaking, the pump light is emitted from an LD of InGaAs type, InGaAsAl type, GaInAsP type, etc., various types of LD being selected according to the pump wavelength.

A polarization maintaining optical fiber is composed of a core adapted to propagate light like an optical fiber and a clad having a refractive index lower than that of the core, a stress applying member being arranged in the clad so as to be on either side of the core. Usually, the stress applying member is formed of a material having a large coefficient of thermal expansion, applying tensile stress to the core. As a result, the refractive index differs between the surface where the stress applying member is arranged and the surface orthogonal thereto, that is, a so-called birefringence occurs, light being propagated at different velocities through these surfaces. Generally speaking, the core is formed of $GeO_2+SiO_2$, the clad is formed of $SiO_2$, and the stress applying member is formed of $B_2O_3+SiO_2$.

Assuming that there is no mode coupling between the light propagated along the slow axis of the polarization maintaining fiber and birefringent crystal having high refractive index and the light propagated along the fast axis thereof having low refractive index, the propagation velocities of the lights distributed in the two modes differ, so that there is a relative time difference, that is, a retardation, at the output end of the polarization maintaining fiber and birefringent crystal. This retardation deteriorates the coherence of the light propagated in the two modes, so that when the retardation is sufficiently long, combination of the lights output from the polarization maintaining fiber and birefringent crystal results in the polarization state fluctuating markedly within a minute period of time. As a result, the degree of polarization is deteriorated as compared with that of inputting.

The degree of polarization (DOP) (%) is the ratio of the sum of the intensities of the polarization component and the depolarization component to the intensity of the polarization component. The value of DOP depends upon the difference between the coherent length of light and the optical distance of lights propagated along the fast axis and the slow axis of the birefringent material. Since the difference in optical distance depends upon the length of the birefringent material, the value of DOP is related to the length of the birefringent material, the polarization component being gradually reduced as the length of the birefringent material increases.

The DOP is determined by the relationship between the retardation due to the birefringent material and the coherence of the light source. Coherence indicates the degree of interference effect of a lightwave obtained through retardation or spatial lateral deviation thereof.

When the retardation is smaller than the coherence of the pump light source, the lights of the two modes indicate high coherence, so that the DOP after the combination at the output end of the birefringent material is high. When the retardation is sufficiently bigger than the coherence of the light source, the coherence of the lights of the two modes is low, so that the polarization state after the combination fluctuates rapidly. As a result, the DOP of the output light decreases.

An explanation is made using an expression. The coherence of the LD light source can be approximately given by the following expression:

$$c \text{ is substantially equal to } 1/\Delta v \tag{1}$$

where c is the coherent time, and $\Delta v$ is the full width at half maximum of the spectrum (frequency).

When the retardation due to the birefringent material is longer than the coherent time of the light source, the DOP is reduced. Thus, when the following relationship is satisfied, the light is in the depolarized state:

$$c <<[d(\beta f - \beta s)L/d\omega] \tag{2}$$

where $\beta f$ and $\beta s$ are the propagation constants of the fast axis and the slow axis, respectively, and L is the length of the birefringent material.

Figure 9:
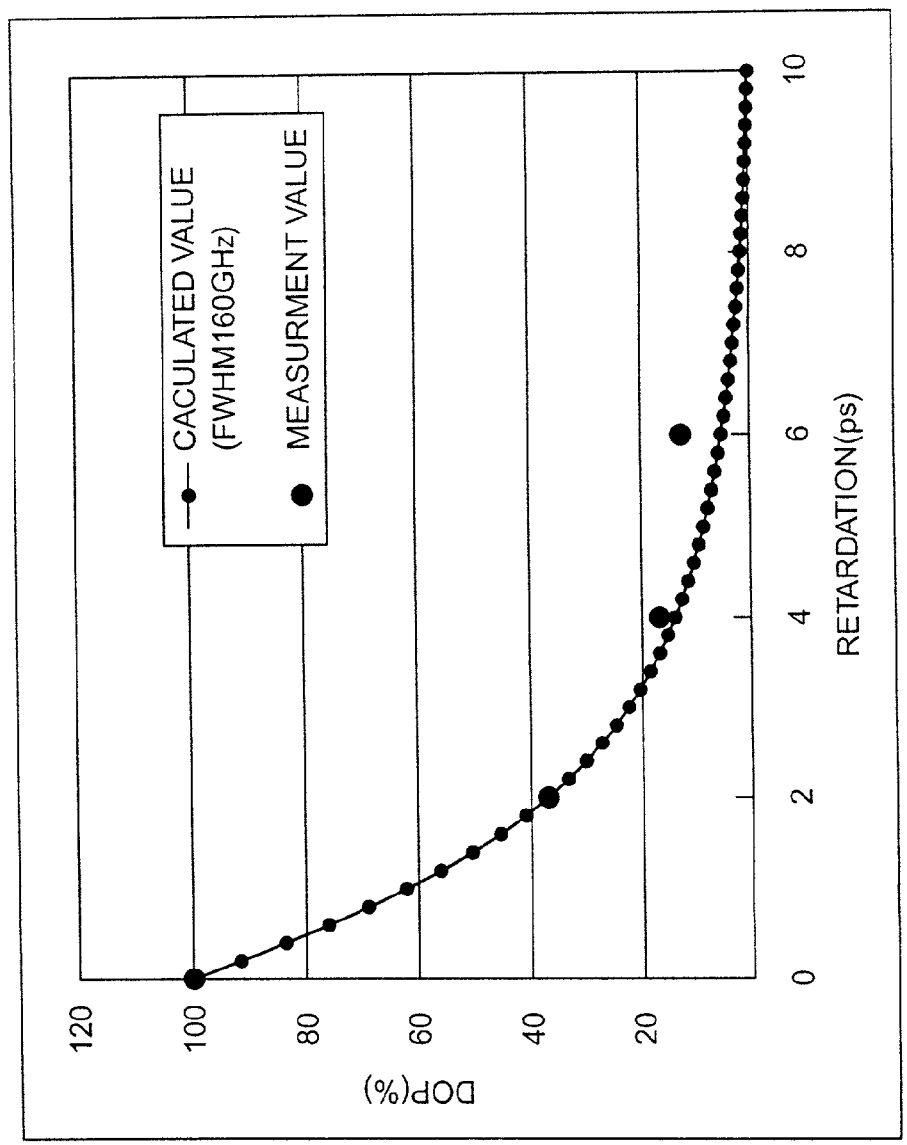
FIG. 9 shows the relationship between polarization and the retardation of light propagated along a fast axis and a slow axis of a birefringent material.

Calcite was used for the birefringent material, and the DOP was measured with the length thereof varied. The measurement results are shown in FIG. 9. As can be seen from the figure, the DOP decreases as the retardation due to the birefringent material increases. In FIG. 9, the line formed by the smaller dots indicates the results of the calculation of the DOP on the basis of the retardation, using the spectral half-width of the LD light. Thus, the measurement values coincide well with the results of the calculation of the difference of retardation and the DOP based on the spectral half-width of the LD light.

Embodiment 1

FIG. 1 shows the construction of a pump light source device 7 for amplification according to the present invention. In FIG. 1, 71 and 72 indicate semiconductor laser diodes of different oscillation wavelengths, 73 and 74 indicate polarization maintaining optical fibers, 75 indicates an output optical transmission line, 8 indicates a polarization beam combiner, and 9 indicates a depolarizer.

The polarization beam combiner 8 has two input terminals 81 and 82 and one output terminal 83. The beams input to the input terminals 81 and 82 and differing in polarization by 90 degrees ($\pi/2$ rad) are propagated through a birefringent material arranged therein and consisting of rutile, calcite or the like before output from the output terminal 83 as composite lightwaves which have linear polarization respectively and have orthogonal state of polarization each other. The semiconductor laser diode 71 and the input terminal 81 are connected to each other through the polarization maintaining optical fiber 73, and the semiconductor laser diode 72 and the input terminal 82 are connected to each other through the polarization maintaining optical fiber 74. Pump lights emitted from the semiconductor laser diodes 71 and 72 are guided to the input terminals 81 and 82 of the polarization beam combiner 8 so as to be different from each other in polarization surface by $\pi/2$ rad while being maintained in the polarized state.

Figure 2:
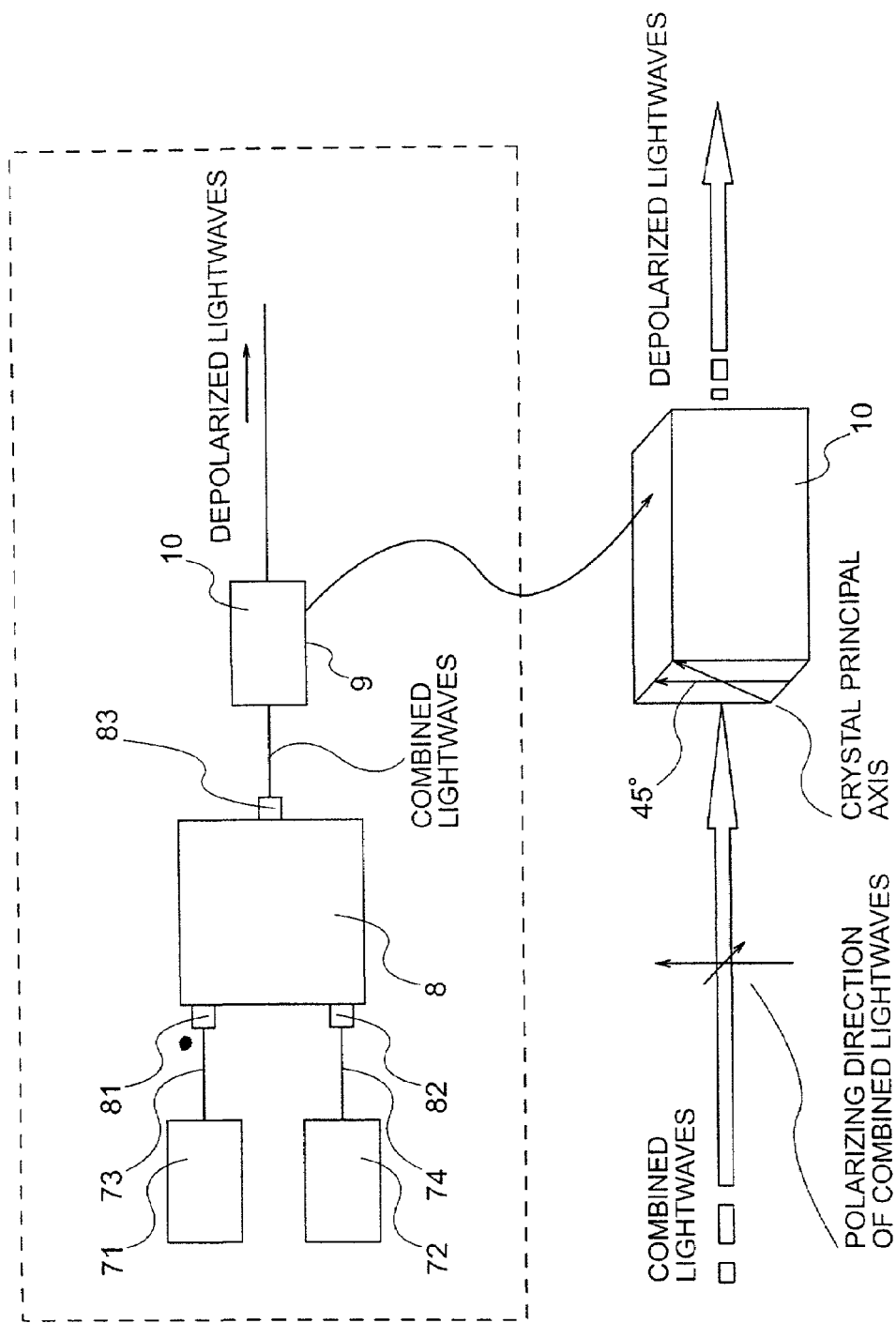
FIG. 2 is a schematic diagram in accordance with an embodiment of the present invention.

As stated above, the pump lights input to the input terminals 81 and 82 are combined through a birefringent material or the like in the polarization beam combiner 8 and output from the output terminal 83 as composite lightwaves which have linear polarization respectively and have orthogonal state of polarization each other. The combined pump lights differing from each other in polarization surface by $\pi/2$ rad output from the output terminal 83 are input to a birefringent material 10 constituting the depolarizer 9. As shown in FIG. 2, in this process, they are coupled such that the polarization surfaces of the pump lights differ from the optical principal axis (fast axis or slow axis surface) of the birefringent material 10 by 45 degrees ($\pi/4$ rad).

As a result, the composite lightwave output from the polarization beam combiner 8 is input to the fast axis and the slow axis of the birefringent material 10 in equal quantities. Similarly, the pump light radiated from the semiconductor laser diode 72 is input to the fast axis and the slow axis of the birefringent material 10 in equal quantities. The pump lights from the semiconductor laser diodes 71 and 72 distributed into two and input to the birefringent material 10 are propagated along the slow axis and the fast axis of the birefringent material 10. Here, the length of the birefringent material 10 is determined such that the retardation difference between the lightwaves propagated along the slow axis and the fast axis is larger than the coherent time of the pump lights radiated from the semiconductor laser diodes 71 and 72.

As a result, the mutual coherence of the pump lights output from the fast axis and the slow axis of the birefringent material 10 decreases.

Figure 10:
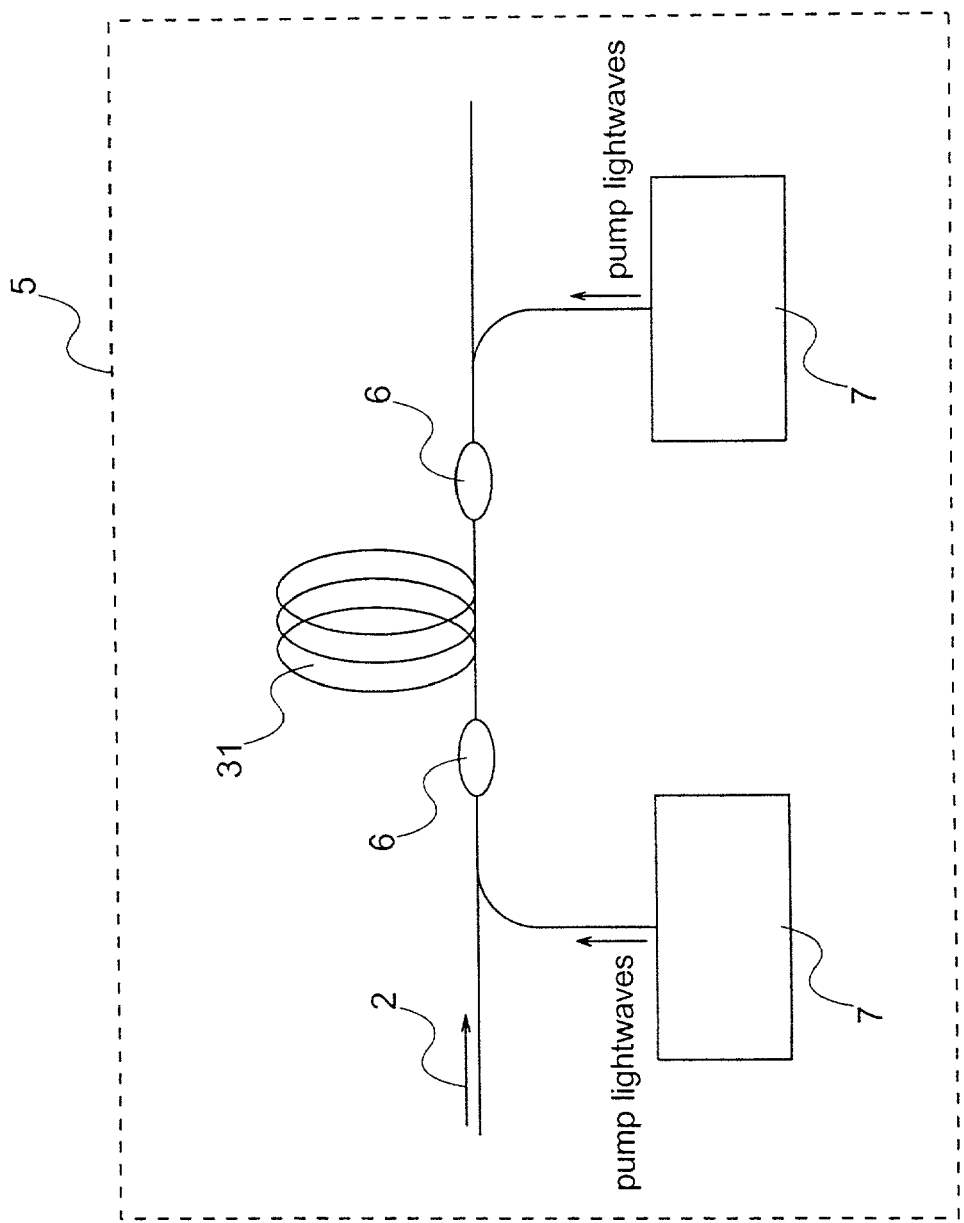
FIG. 10 is a schematic diagram showing an ordinary pump light source device for Raman amplification.
Figure 11:
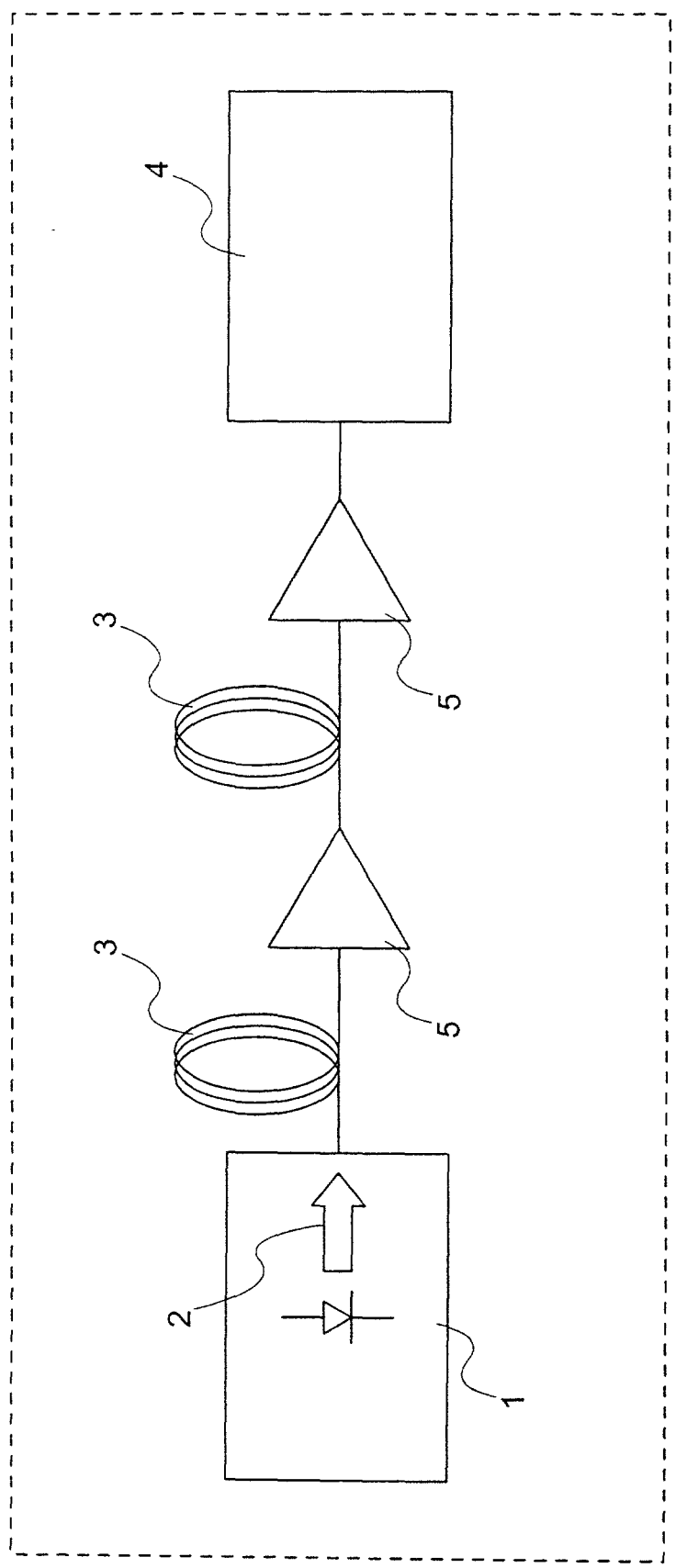
FIG. 11 is a schematic diagram showing an ordinary Raman amplification system.

Thereafter, the pump lights output from the birefringent material 10, reduced in mutual coherence, are output to a light transmission path 75 consisting of an ordinary optical fiber. The pump lights guided to the light transmission path 75 are propagated through the light transmission path 75 to be guided to an optical coupler 6 shown in FIG. 10, where they are combined with the signal lightwave 2, whereby the signal lightwave 2 undergoes Raman amplification in the amplification medium 31 shown in FIG. 10.

The pump light output from the semiconductor laser diode 71 or 72 has a wavelength shorter than the wavelength of the signal lightwave by 50 to 200 nm (preferably approximately 100 nm).

Embodiment 2

Figure 3:
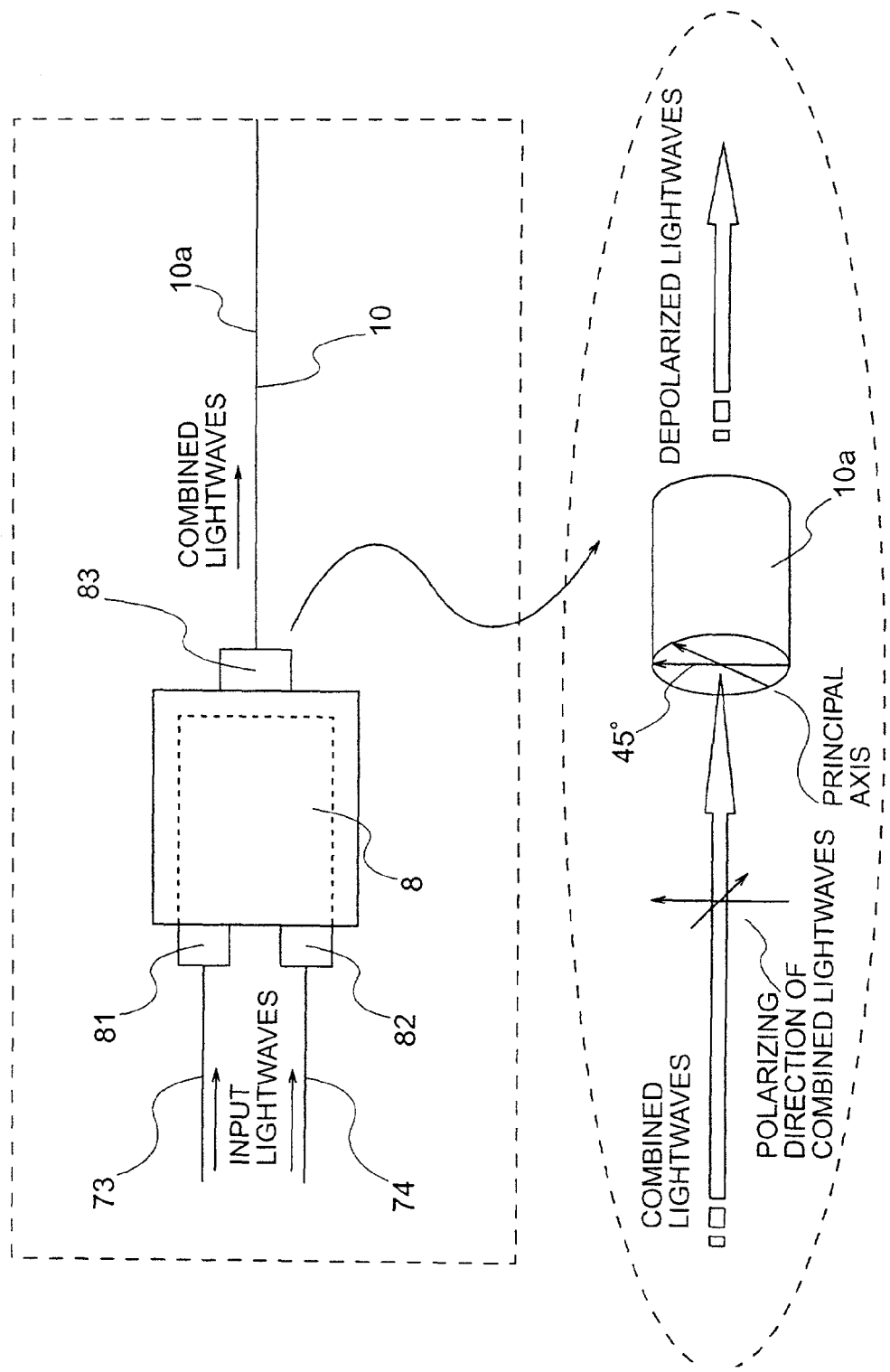
FIG. 3 is a schematic diagram in accordance with another embodiment of the present invention.

FIG. 3 is a schematic diagram showing another embodiment of the present invention, in which a birefringent optical fiber 10a is used as the birefringent material 10. In this case also, the polarization beam combiner 8 and the birefringent optical fiber 10a are arranged such that the polarization surface of one of the composite lightwaves output from the output terminal 83 of the polarization beam combiner 8 and differing from each other in polarization by $\pi/2$ rad differs from the principal axis of the birefringent optical fiber 10a by $\pi/4$ rad.

The operation of this embodiment is the same as that in the case of FIG. 2.

Embodiment 3

Figure 4:
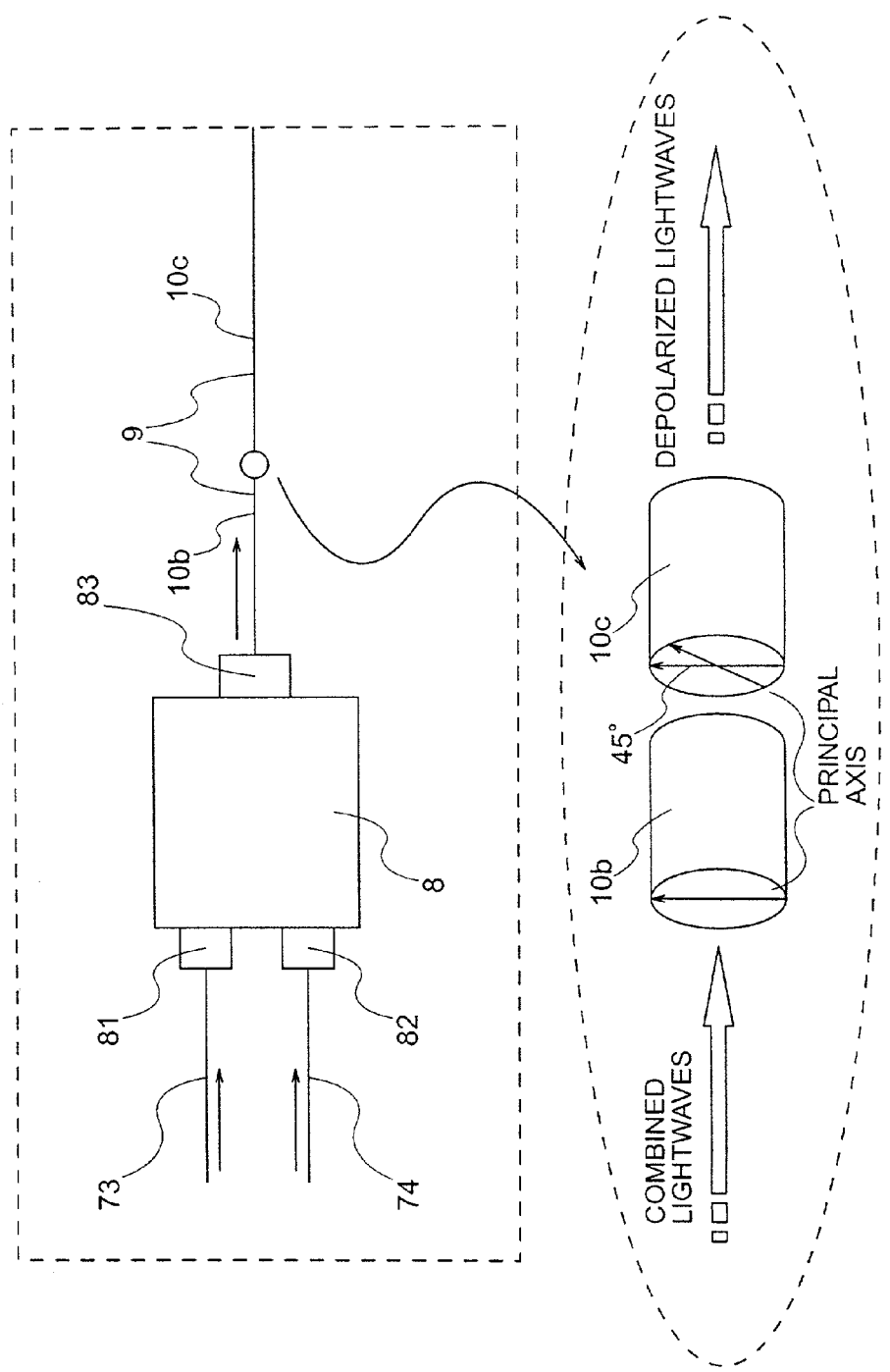
FIG. 4 is a schematic diagram in accordance with still another embodiment of the present invention.

FIG. 4 is a schematic diagram showing still another embodiment of the present invention, in which a LYOT type depolarizer is adopted as the depolarizer 9. In this LYOT type depolarizer, birefringent light transmission paths 10b and 10c are fused to each other in an optical principal axis at an angle of 45 degrees such that the length of the rear portion is not less than two times the length of the front portion (or conversely, the length of the front portion is not less than two times the length of the rear portion). In this case, it is only necessary to effect connection through optical axis alignment, and there is no need to take into consideration the polarization of the birefringent light transmission path 10b and the polarization beam combiner 8.

In the embodiments shown in FIGS. 3 and 4, the birefringent optical fibers 10a and 10c may also serve as the output light transmission path 75.

Further, while in the above embodiments rutile is used as the birefringent material, it is also possible, in the present invention, to use other types of birefringent material, such as calcite. In this case also, the polarization beam combiner 8 and the birefringent material 10 are arranged such that the polarization surface of the pump light output from the polarization beam combiner 8 makes an angle of 45 degrees with the optical principal axis of the birefringent material 10.

Embodiment 4

Figure 5:
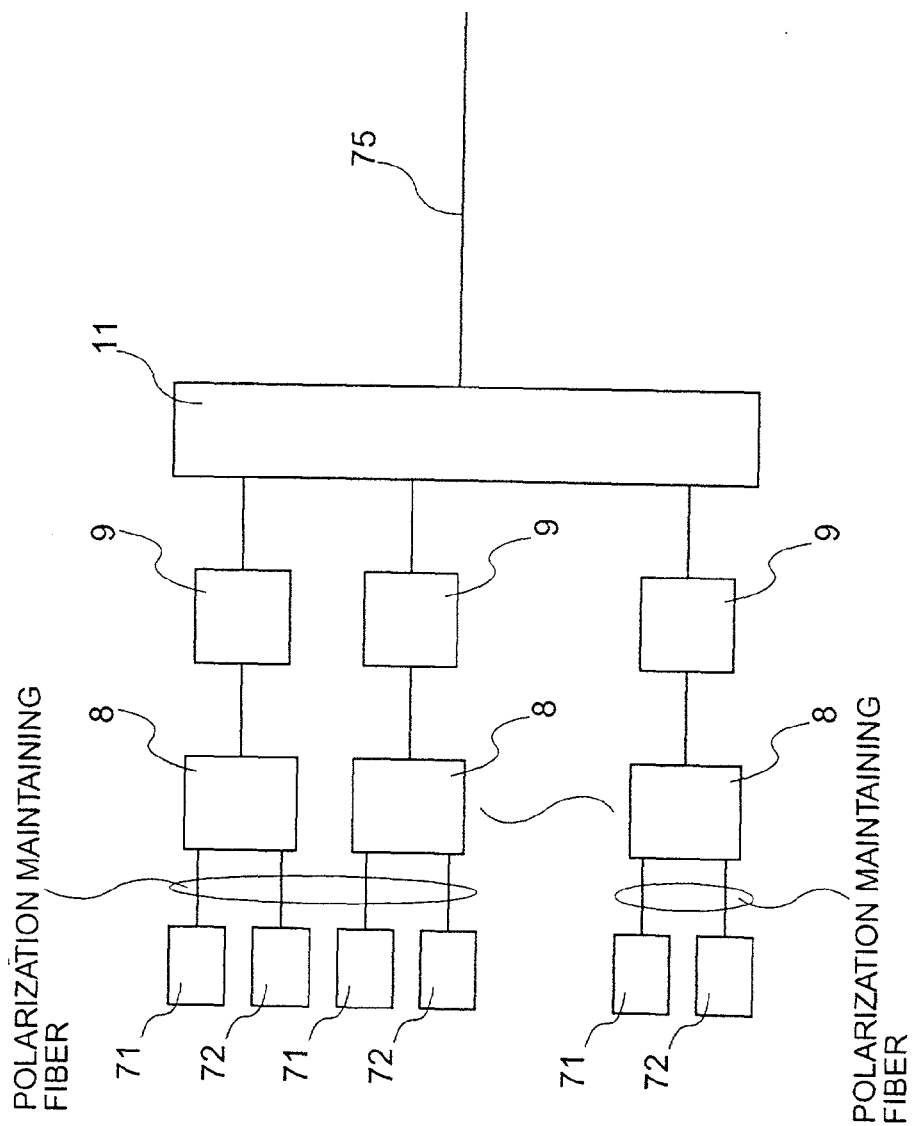
FIG. 5 is a schematic diagram in accordance with still another embodiment of the present invention.

FIG. 5 is a schematic diagram showing still another embodiment of the present invention. In the embodiment shown in FIG. 5, a plurality of pairs of pump light sources, each consisting of two semiconductor laser diodes 71 and 72, are prepared. The lightwaves from each pair of pump light sources are combined by the polarization beam combiner 8, and the combined lightwaves are depolarized by the depolarizer 9. Thereafter, the depolarized combined lightwaves are combined by an optical beam coupler 11 and output to the output light transmission path 75.

Embodiment 5

Figure 6:
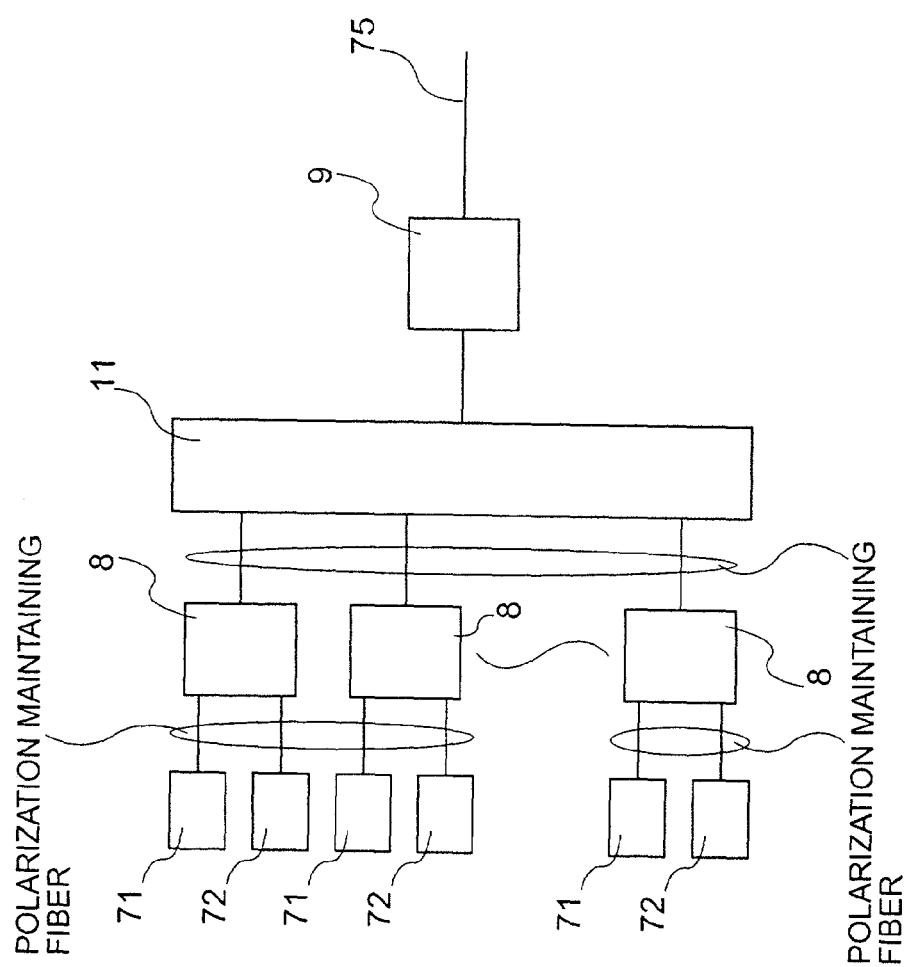
FIG. 6 is a schematic diagram in accordance with still another embodiment of the present invention.

FIG. 6 is a schematic diagram showing still another embodiment of the present invention. In the embodiment shown in FIG. 6, a plurality of pairs of pump light sources, each consisting of two semiconductor laser diodes 71 and 72, are prepared. The lightwaves from each pair of pump light sources are combined by a polarization beam combiner 8, and the combined lightwaves are combined by the polarization-maintaining optical beam coupler 11. Thereafter, the lightwave is guided to the depolarizer 9 to depolarize the entire combined lightwave at one time.

Embodiment 6

Figure 7:
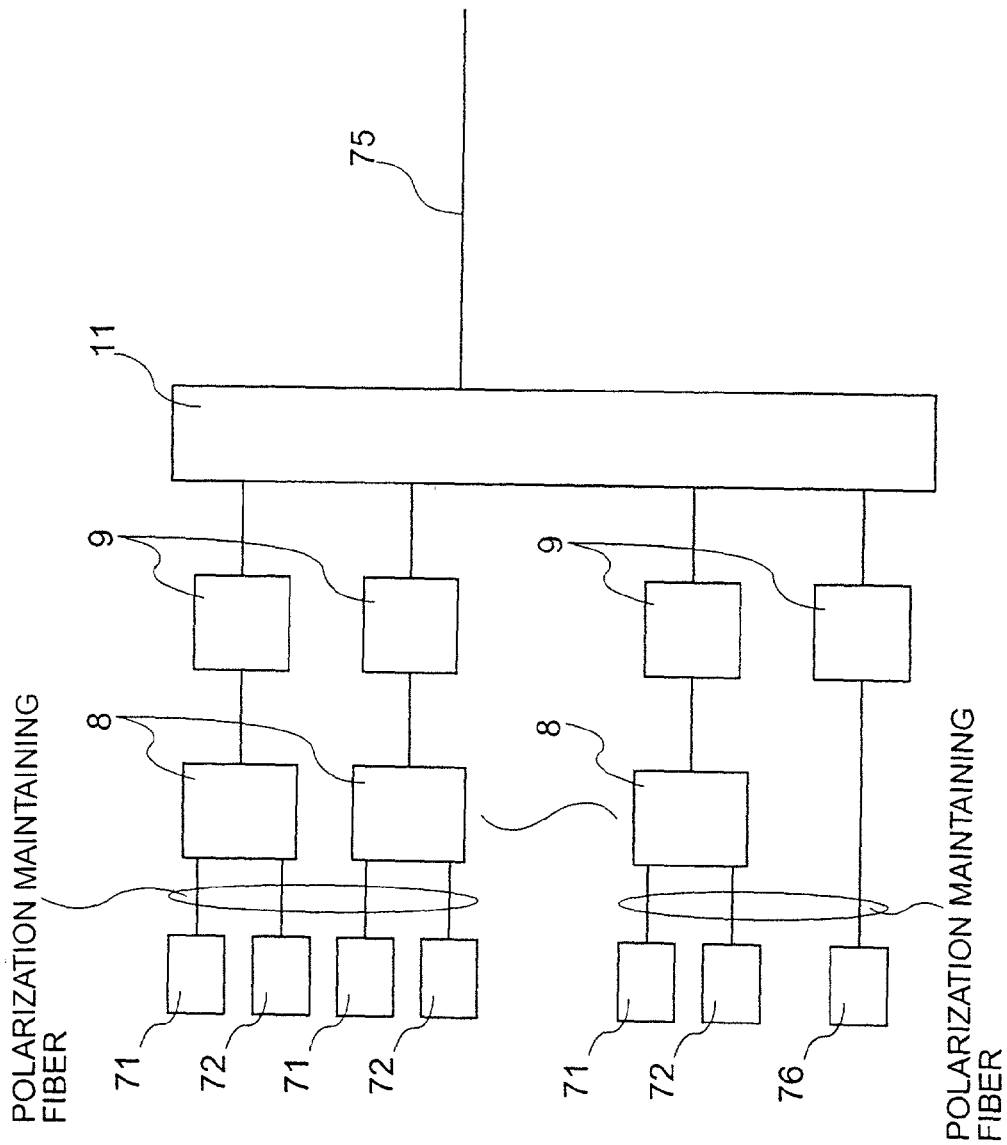
FIG. 7 is a schematic diagram in accordance with still another embodiment of the present invention.

FIG. 7 is a schematic diagram showing still another embodiment of the present invention. In the embodiment shown in FIG. 7, a plurality of pairs of pump light sources, each consisting of two semiconductor laser diodes 71 and 72, are prepared. Further, there is provided an individual pump light source consisting of an independent semiconductor laser diode 76. The lightwaves from the pairs of pump light sources are combined by a polarization beam combiner 8, and the combined lightwaves are depolarized by the depolarizers 9. Further, the lightwave from the individual light source is depolarized by the depolarizer 9, both the depolarized lightwaves being combined by an optical beam coupler 11.

While in this embodiment there is provided only one individual light source and one depolarizer 9 related thereto, it is also possible in the present invention to provide a plurality of sets of these components.

Embodiment 7

Figure 8:
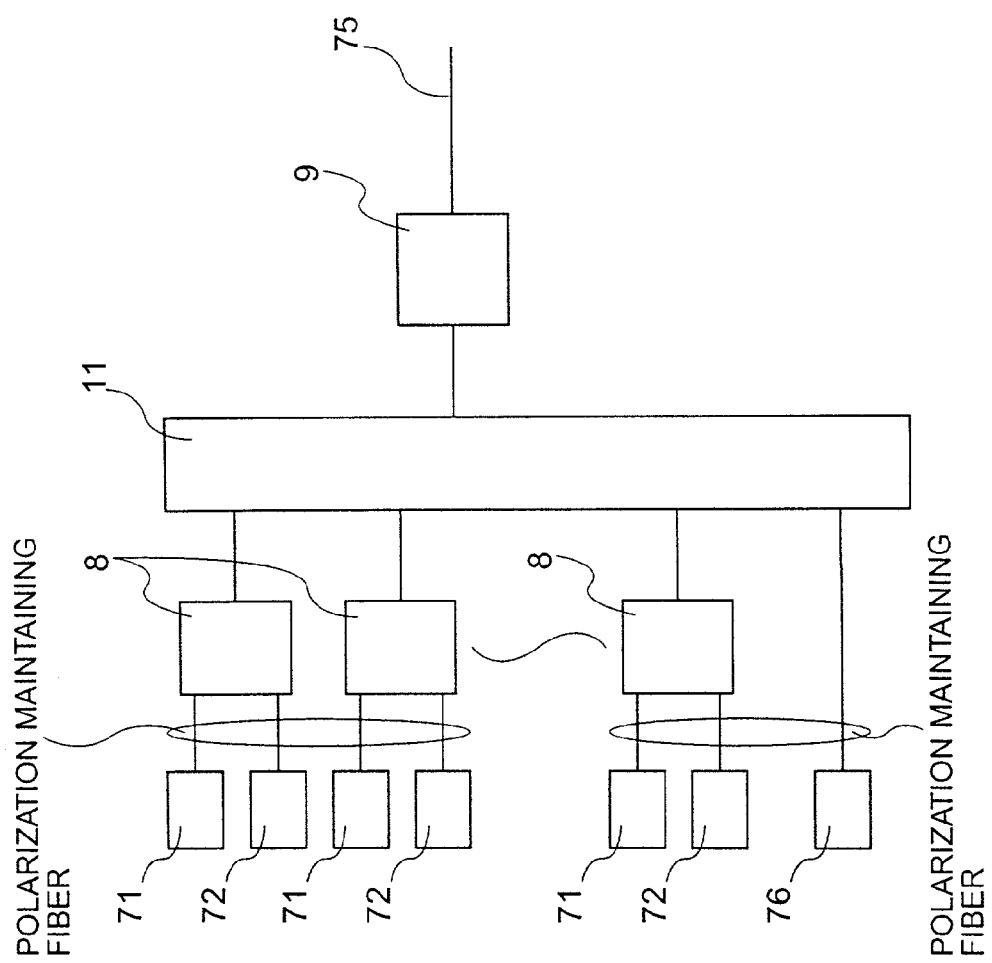
FIG. 8 is a schematic diagram in accordance with still another embodiment of the present invention.

FIG. 8 is a schematic diagram showing still another embodiment of the present invention. In the embodiment shown in FIG. 8, a plurality of pairs of pump light sources, each consisting of two semiconductor laser diodes 71 and 72, are prepared. Further, there is provided an individual light source consisting of an independent semiconductor laser diode 76. The lightwaves from the pairs of light sources are combined by the polarization beam combiners 8, and the combined lightwaves of these pairs and the lightwave from the individual light source are input to the polarization-maintaining optical beam coupler 11 to combine these lightwaves. Thereafter, the combined lightwave is depolarized by the depolarizer 9.

As in the above embodiment, there is provided only one individual light source and one depolarizer 9 related thereto in this embodiment. However, it is also possible in the present invention to provide a plurality of sets of these components.

Further, it is also possible to form in the polarization maintaining optical fibers 73 and 74 light reflecting layers by a fiber grating substantially in conformity with the lightwaves from the semiconductor laser diodes 71 and 72, thereby stabilizing the oscillation wavelength of the semiconductor laser diodes 71 and 72 and reducing the oscillation wavelength band.

While in the above-described embodiments of the present invention lightwaves from two light sources are combined by using a polarization beam combiner, it is also possible in the present invention to replace a part or all of the polarization beam combiner by a polarization-maintaining optical beam coupler.

Further, in the present invention, it is possible to provide an optical isolator in one or more of the following: the optical path on the input side of the depolarizer, the optical path on the output side of the depolarizer, and the interior of the depolarizer. That is, it is possible to provide an optical isolator in the optical path from the semiconductor laser diodes 71 and 72 to the output light transmission path 75. Due to this construction, it is possible to prevent the semiconductor laser diodes, etc. from being adversely affected by the reflection from the optical components on the post-deflection side.

In accordance with the present invention, a plurality of pump lights of the same or different pump wavelengths are combined by using a polarization beam combiner or a polarization-maintaining optical beam coupler, and then the pump lights are depolarized, whereby it is possible to eliminate the polarity dependence of the amplification gain even in a case where one semiconductor laser diode is provided per wavelength. As a result, it is possible to provide a pump light source device for amplification and an optical Raman amplification system in which the number of semiconductor laser diodes for pump is reduced and which are, consequently, inexpensive.

In accordance with the present invention, lightwaves output from two light sources of the same or different wavelengths are combined by a polarization beam combiner, and then the degrees of polarization of the two pump lights are simultaneously reduced through a depolarizer, whereby even when one of the light sources of the same wavelength is out of order, it is possible to eliminate the polarization dependence of the Raman amplification gain, thus providing an optical Raman amplifier with stabilized gain. Also, even when only one light source of a single wavelength is used, it is possible to eliminate the polarization dependence of the Raman amplification gain, thereby providing an optical Raman amplifier with stabilized gain. Further, when combining outputs from light sources of different wavelengths, it is possible to effect the combination without involving any limitation regarding the wavelength intervals and spectral line widths of the light sources. Further, by reducing the number of parts, it is possible to provide a simplified device.

What is claimed is:

1. A pump light source device for outputting a pump light to amplify signal lightwaves transmitted into an optical fiber utilizing Raman scattering comprising:
    a plurality of pairs of pump light sources,
    a plurality of polarization beam combiners or polarization-maintaining optical beam couplers,
    a plurality of depolarizers, and
    an optical beam coupler for combining a plurality of lightwaves,
    the output lightwaves from each pair of light sources being respectively input to a combiner or coupler of the plurality of polarization beam combiners or polarization-maintaining optical beam couplers to output a composite lightwave with orthogonal state of polarization or maintaining the polarization state of inputting, each composite lightwave being respectively input to a depolarizer of the plurality of depolarizers so as to output depolarized lightwaves with a lower degree of polarization, wherein the depolarized lightwaves being combined and output by the optical beam coupler.

2. A pump light source device for outputting a pump light to amplify signal lightwaves transmitter into an optical fiber utilizing Raman scattering comprising:
    a plurality of pairs of pump light sources,
    a plurality of polarization beam combiners or polarization-maintaining optical beam couplers,
    a depolarizer, and
    a polarization beam combiner or polarization-maintaining optical multiplexer for combining a plurality of lightwaves,
    the output lightwaves from each pair of pump light sources being respectively input to a combiner or multiplexer of the said polarization beam combiners or polarization-maintaining optical beam couplers so as to output a composite lightwave with orthogonal state of polarization or maintaining the relationship of inputting, after each composite lightwave is being combined by the polarization beam combiner or polarization-maintaining optical beam coupler, the combined lightwaves being input to the depolarizer so as to output lightwaves with a lower degree of polarization.

3. A pump light source device for outputting pump lights to amplify signal lightwaves transmitted into an optical fiber utilizing Raman scattering comprising:
    one or a plurality of pairs of pump light sources,
    one or a plurality of individual light sources which are different therefrom,
    a plurality of polarization beam combiners or beam combiners or polarization-maintaining optical beam couplers,
    a polarization-maintaining optical multiplexer for combining a plurality of lightwaves, and
    a depolarizer, wherein
    output lightwaves from each pair of pump light sources being respectively input to a combiner or coupler of the plurality of the said polarization beam combiners or the said polarization-maintaining optical beam couplers to so as output a composite lightwave with orthogonal state of polarization or maintaining the relationship of inputting, each lightwave output from the one or plurality individual light sources being combined by the polarization-maintaining optical beam coupler, and the combined lightwaves being input to the depolarizer so as to output a lightwave with lower degree of polarization as a pump light.

4. A pump light source for Raman amplification according to any one of claims 1, 2, and 3, wherein the depolarizer consists of a birefringent material having different refractive indexes at principal axes, and is arranged such that an angle between polarization of each lightwave of the composite lightwave output from the polarization beam combiner or the polarization-maintaining optical beam coupler and the optical principal axis of the birefringent material is 45 degrees, the composite lightwave being depolarized in the birefringent material.

5. A pump light source device for Raman amplification according to claim 4, wherein the birefringent material consists of rutile.

6. A pump light source device for Raman amplification according to claim 4, wherein the birefringent material consists of calcite.

7. A pump light source device for Raman amplification according to claim 4, wherein the birefringent material consists of a polarization maintaining optical fiber.

8. A pump light source device for Raman amplification according to claim 4, wherein the depolarizer consists of a LYOT type depolarizer in which two birefringent material, the length of one of them different from that of the other in ratio of more than 1:2, are connected such that the respective optical principal axes differ from each other by 45 degrees.

9. A pump light source device for Raman amplification according to claim 4, wherein an optical isolator is provided in one or more of the following: an optical path on the input side of the depolarizer, an optical line on the output side of the depolarizer, and the interior of the depolarizer.

10. A Raman amplification system comprising:
  a light transmitting station for transmitting signal lightwaves, a light receiving station for receiving the signal lightwaves,
  an optical fiber for propagating the signal lightwaves from the light transmitting station to the light receiving station, and
  a Raman amplification pump light source device for introducing a pump light into the optical fiber to amplify the signal lightwaves using stimulated Raman scattering process, wherein
  said Raman amplification pump light source device consists of a pump light source device for Raman amplification as claimed in claim 4.

* * * * *